(12) United States Patent
Lubicki et al.

(10) Patent No.: US 7,576,337 B2
(45) Date of Patent: Aug. 18, 2009

(54) POWER SUPPLY FOR AN ION IMPLANTATION SYSTEM

(75) Inventors: Piotr Lubicki, Peabody, MA (US); Russell Low, Rowley, MA (US); Steve Krause, Ipswich, MA (US); Eric Hermanson, Georgetown, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 156 days.

(21) Appl. No.: 11/620,595

(22) Filed: Jan. 5, 2007

(65) Prior Publication Data
US 2008/0164408 A1 Jul. 10, 2008

(51) Int. Cl.
*H01J 37/08* (2006.01)
(52) U.S. Cl. ............ 250/492.1; 250/492.2; 250/492.22; 250/492.3; 315/111.81; 315/111.91; 315/200 R; 315/205; 427/523; 219/121.21; 363/17; 200/2.1 R
(58) Field of Classification Search ............... 250/495.1, 250/492.2, 492.21, 492.3, 492.32; 315/111.81, 315/111.91, 200 R, 205; 427/523; 219/121.21, 219/121.22, 121.24, 121.34; 363/17, 59, 363/61; 200/2.1 R; 174/17 R, 17 GF
See application file for complete search history.

(56) References Cited

U.S. PATENT DOCUMENTS

| | | | | |
|---|---|---|---|---|
| 2,823,347 A | * | 2/1958 | Procter | 363/59 |
| 3,418,526 A | * | 12/1968 | Simon et al. | 315/205 |
| 3,708,740 A | * | 1/1973 | Pierson | 363/61 |
| 4,733,137 A | * | 3/1988 | Dunham | 315/291 |
| 4,778,975 A | * | 10/1988 | Etarski et al. | 219/121.34 |
| 5,093,646 A | * | 3/1992 | Herbert | 336/225 |
| 5,231,564 A | * | 7/1993 | Pellegrino et al. | 363/61 |
| 5,350,926 A | * | 9/1994 | White et al. | 250/492.21 |
| 5,388,607 A | * | 2/1995 | Ramaker et al. | 137/88 |
| 6,348,122 B1 | * | 2/2002 | Wagner | 156/308.2 |
| 2003/0058659 A1 | * | 3/2003 | Klinkowstein | 363/17 |
| 2005/0178981 A1 | * | 8/2005 | Renau et al. | 250/492.21 |
| 2007/0139976 A1 | * | 6/2007 | deRochemont | 363/17 |
| 2007/0235663 A1 | * | 10/2007 | Low et al. | 250/492.1 |
| 2008/0073578 A1 | * | 3/2008 | Tekletsadik et al. | 250/492.21 |

FOREIGN PATENT DOCUMENTS

| | | |
|---|---|---|
| EP | 0753923 B1 | 1/1997 |
| EP | 0973249 A1 | 1/2000 |
| GB | 1209228 A | 10/1970 |

OTHER PUBLICATIONS

Reginato and Smith, "A 600 -kV, 10 -mA dc Cockcroft—Walton Rectifier using Silicon Diodes at 100kc", IEEE Transactions on Nuclear Science, IEEE, p. 274-278, 1965.

* cited by examiner

*Primary Examiner*—David A Vanore
*Assistant Examiner*—Michael Maskell

(57) ABSTRACT

A power supply system for an ion implantation system. In one particular exemplary embodiment, the system may be realized as a power supply system that includes a low frequency power inverter, a stack driver and a high voltage power generation unit that receives source power from the power inverter. The high voltage generation unit may include a high voltage transformer for providing an output power that is multiplied to a desired output level and delivered to an input terminal of an ion beam accelerator. The power supply system may also include a dielectric enclosure that encases at least a portion of the high voltage power generation unit, thereby preventing variation in the break down strength of the internal components.

16 Claims, 5 Drawing Sheets

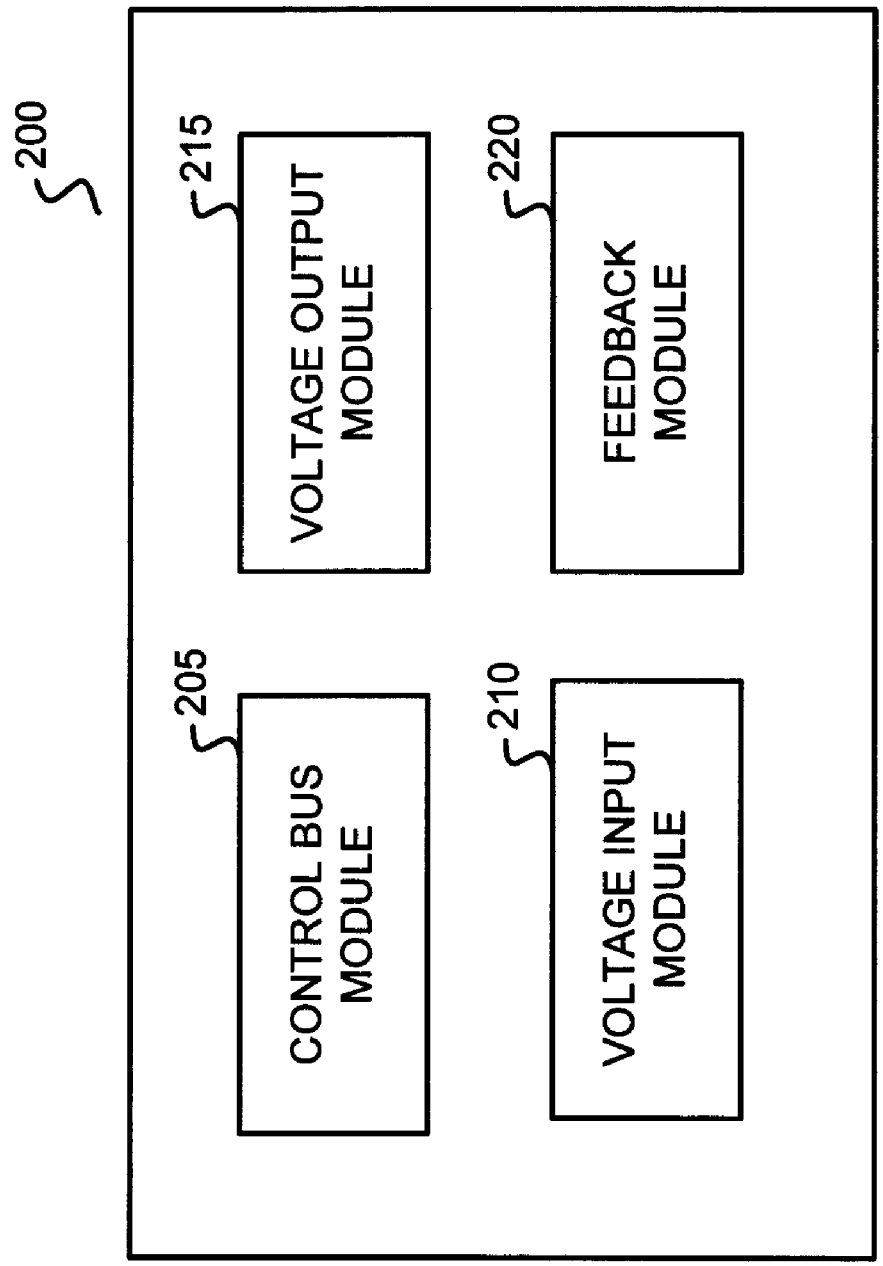

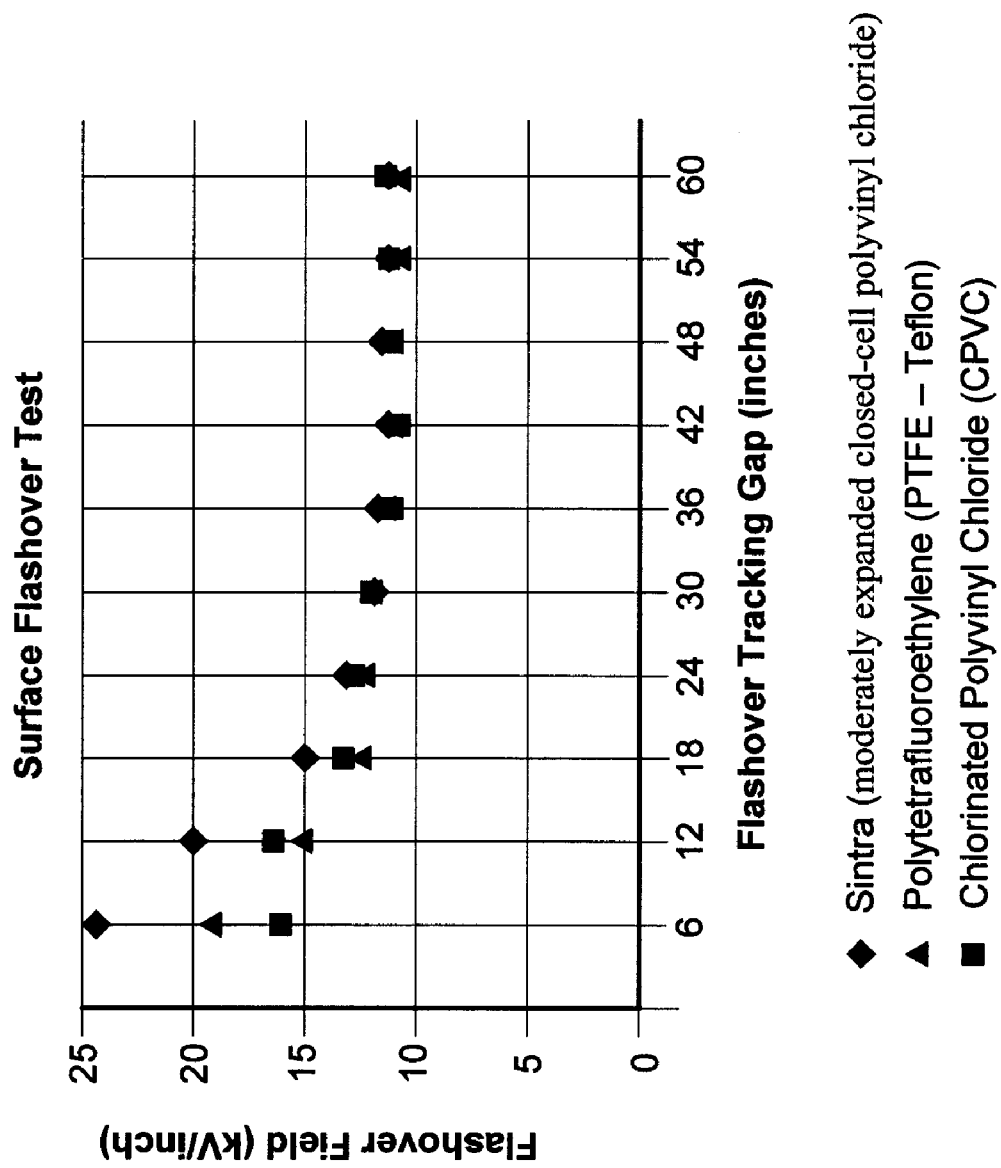

POWER SUPPLY FOR AN ION IMPLANTATION SYSTEM

FIELD OF THE DISCLOSURE

The present disclosure relates generally to ion implantation equipment and more particularly, to a power supply for an ion implantation system.

BACKGROUND OF THE DISCLOSURE

In semiconductor manufacturing, ion implantation is used to change the material properties of portions of a substrate. Indeed, ion implantation has become a standard technique for altering properties of semiconductor wafers during the production of various semiconductor-based products. Ion implantation may be used to introduce conductivity-altering impurities, to modify crystal surfaces (pre-amorphization), to created buried layers (halo implants), to create gettering sites for contaminants, and to create diffusion barriers (F and C implant). Also, implantation may be used in semiconductors for non-transistor applications such as for alloying metal contact areas, in flat panel display manufacturing and in other surface treatment. All of these ion implantation applications may be classified generally as forming a region of material property modification.

One reason for the popularity of ion implantation is its versatility in types of applications as well as its ability to inject ion impurities to a precise depth—a feature particularly important as the level of integration of semiconductor devices increases.

Conventional ion implantation systems include an ion source that ionizes a desired dopant element which is then accelerated to form an ion beam of prescribed energy. This beam is directed to the surface of a workpiece. Generally, energetic ions of the ion beam penetrate into the bulk of the workpiece and are embedded into a crystalline lattice of the workpiece to form a region of desired conductivity. This ion implantation process is generally performed in a high vacuum, gas-tight process chamber which encases a wafer handling assembly and the ion source.

A typical ion beam path in prior art implantation systems includes an ion source, one or more electrodes, an analyzing magnet arrangement, an optical resolving element, and a wafer processing system. The electrodes extract and accelerate ions generated in the ion source to produce a beam directed toward the analyzing magnet arrangement. The analyzing magnet arrangement sorts ions in the ion beam according to their charge-to-mass ratio, and the wafer processing system adjusts the position of a workpiece relative to the ion beam path.

Ion implantation systems generally provide high voltages to produce acceleration energies necessary to implant ions into a substrate. Acceleration energies may range from 10-200 keV in many implantation systems to energies as high as several MeV in high-energy systems. Generally, such high voltages are applied via electrodes supplied by high voltage power supplies. Size becomes a constraint in designing such high voltage power supplies because of the possibility of overheating, flashover, and unintended voltage arcing. Furthermore, these high voltages can cause power supplies to fail over time at a faster rate than if operated at lower voltage levels. Thus, as you shrink the size of the device the system becomes more susceptible to arc break down and also to becoming flammable in the case of a break down.

Accordingly, it would therefore be desirable to have a system and method which mitigates such power supply overload and/or voltage collapse conditions.

SUMMARY OF THE DISCLOSURE

A power supply for an ion implantation system is disclosed. In one particular exemplary embodiment, the system may be realized as a power supply enclosed in a dielectric material. The power supply may include a high voltage power generation unit encased in an airtight dielectric enclosure that prevents variation in the break down of internal elements. The power supply may also include a low frequency power inverter and a stack driver for controlling the amount of multiplication performed on the input power by the high voltage power generation unit.

In accordance with another particular exemplary embodiment, a power supply for an ion implantation system is provided. The power supply according to this embodiment may comprise a power inverter, a high voltage power generation unit that receives source power from the power inverter, wherein the high voltage generation unit comprises a high voltage transformer for providing an output power that is multiplied to a desired output level, and an enclosure comprising a dielectric material to encase at least a portion of the high voltage power generation unit.

In accordance with yet another particular exemplary embodiment, an ion implantation device is provided. The ion implantation device according to this particular exemplary embodiment may comprise an ion source to generate an ion beam, at least one ion beam accelerator to accelerate the ion beam to a desired energy level, a power supply operatively connected to the ion beam accelerator, at least one mass analyzer to remove undesired ion species from the ion beam, at least one beam shaping element to shape and direct the ion beam, a substrate processing end station upon which the shaped ion beam is incident, and a controller communicatively coupled to the ion source, the power supply, and the end station, wherein the power supply comprises a power inverter, the high voltage power generation unit that receives source power from the power inverter, and an enclosure comprising a dielectric material to encase at least a portion of the high voltage power generation unit.

In accordance with still another particular exemplary embodiment a power supply system for ion implantation equipment may be provided. The power supply system according to this particular exemplary embodiment may comprise a power inverter, a high voltage power generation unit that receives source power from the power inverter, wherein the high voltage power generation unit comprises a transformer for providing an output power that is multiplied to a desired output level and supplied to an ion beam accelerator, an enclosure comprised of a dielectric material to encase at least a portion of the high voltage power generation unit, and a stack driver to receive controls signals from a computerized controller of the implantation equipment, indicative of a desired output power of the transformer and to cause the high voltage power generation unit to output the output power at the desired output level.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 4 is a block diagram of illustrating various components of a power supply system stack driver for an ion implanter according to at least one embodiment of the present disclosure.

FIG. 5 is a graph illustrating surface flashover test results for a plurality of different dielectric materials.

DETAILED DESCRIPTION OF EXEMPLARY EMBODIMENTS

Figure 1:
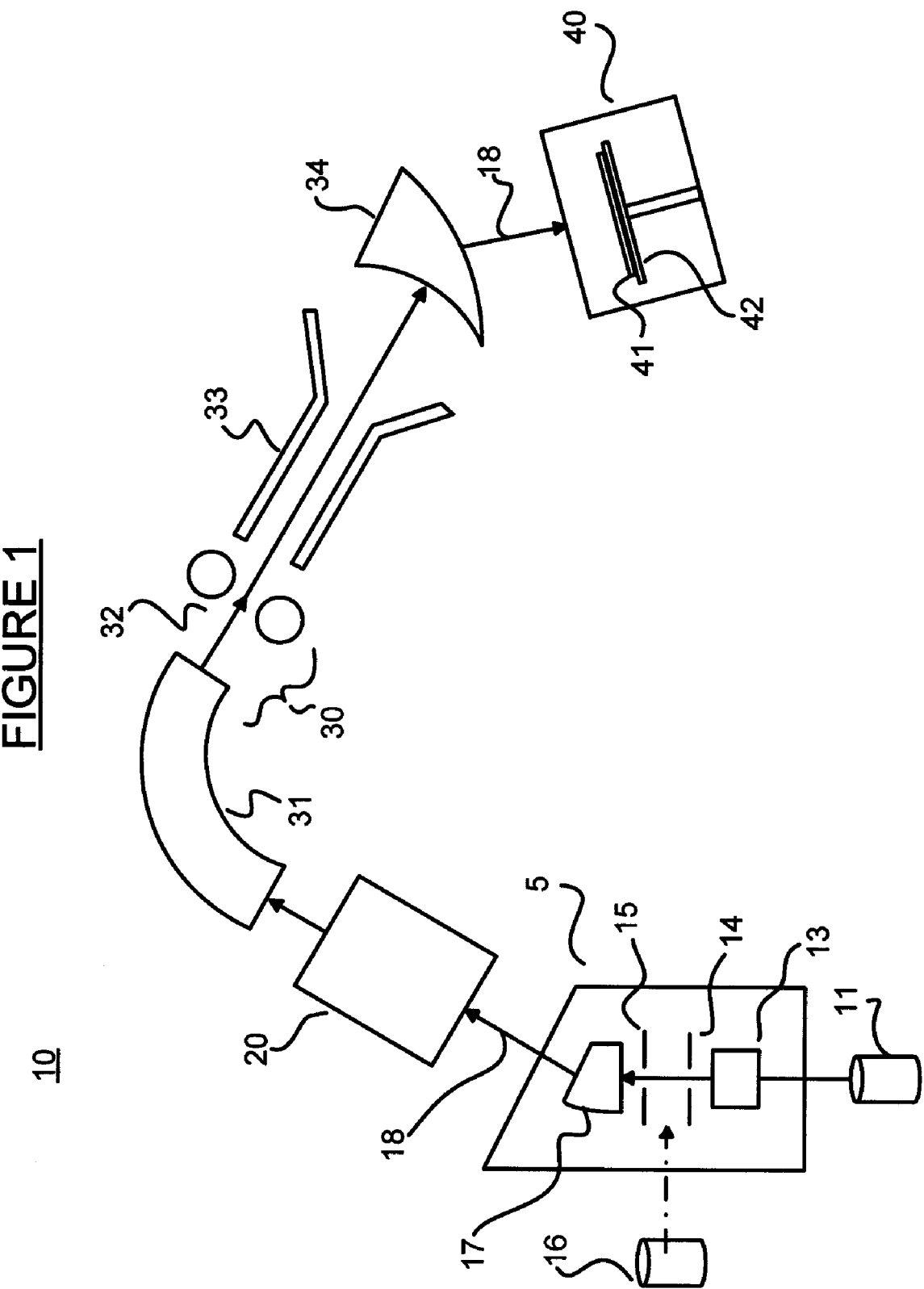
FIG. 1 is a schematic block diagram of an exemplary ion implantation system according to at least one embodiment of the present disclosure.

Referring now to FIG. 1, there is shown a schematic block diagram of an exemplary ion implantation system 10 according to at least one embodiment of the present disclosure. The system 10 illustrated in FIG. 1 includes an ion beam source 5 that generates an ion beam 18 that is transported through the system and impinges upon a target substrate 41. The ion beam 18 may comprise a ribbon shaped ion beam, for example, having a width of about 400 mm for implantation of a 300 mm semiconductor wafer. An exemplary ribbon beam generating ion implantation system may be found in commonly assigned U.S. Pat. No. 6,635,880, entitled "High Transmission, Low Energy Beamline Architecture For Ion Implanter," the disclosure of which is hereby incorporated by reference in its entirety.

The ion beam source station 5 includes an ion source material supply container 11, which may contain gas, solid materials, or combinations thereof. In various embodiments, ion source material from the supply container 11 may be introduced to a beam source 13 and ionized to generate positive ions and electrons. The beam source 13 may comprise a nozzle and or plasma chamber for ionizing the source material from the container 11 into an ionized gas.

In the example of FIG. 1, an extraction electrode 14 may be associated with the beam source 13 for extracting an ion beam 18 from the beam source 13. A suppression electrode 15 may also be associated with the ion beam source station 5. In various embodiments, the ion beam 18 may exit the beam source 13 with a net positive charge due to the presence of more positive ions than electrons in the ion beam 18. In various embodiments, the system may further include a secondary gas supply 16, such as is discussed in commonly assigned U.S. Pat. No. 6,891,173, which is hereby incorporated by reference in its entirety. The secondary gas supply 16 may be arranged to introduce gas into the ion beam 18 to neutralize apace charge of the ion beam 18. For example, the secondary gas may be introduced into a region defined, at least in part, by one of the electrodes 14, 15 associated with the ion beam source 13 and through which the ion beam 18 travels.

The ion beam source station 5 depicted in FIG. 1 may further comprise a source filter 17 that removes undesired species from the ion beam 18. Downstream of source filter 17, the system may include an acceleration/deceleration column 20 in which the ions in the ion beam 18 are accelerated/decelerated to a desired energy depending upon implantation application. It should be appreciated that the acceleration/deceleration column 20 may be located elsewhere along the path of ion beam 18.

The system may also comprise a mass analyzer 30 that removes energy and mass contaminants from the ion beam 18 through the use of a field generating component 31 and a resolving aperture 32. The mass analyzer 30 may include a dipole analyzing magnet that operates to provide a magnetic field across a path of the ion beam 18 so as to deflect ions from the ion beam 18 at varying trajectories according to a charge-to-mass ratio of the respective ions in the ion beam 18. Ions traveling through the magnetic field will experience a force that directs individual ions of a desired mass along the path of the ion beam 18 and that deflects ions of an undesired mass away from the path of the ion beam 18. The mass analyzer 30 may also comprise a mask having a resolving aperture 32 oriented at a trajectory of ions of the desired mass, thereby rejecting other ions of undesired mass from the ion beam 18.

A scanner 33, which may be an electrostatic scanner, may be positioned downstream of the mass analyzer 30. The scanner 33 may be designed to scan the ion beam 18 across the target substrate 41 as desired. The system may also include an angle corrector magnet 34 to deflect ions in the scanned ion beam 18 to produce a scanned ion beam 18 having parallel ion trajectories. Though not depicted in FIG. 1, the system may also include one or more electrostatic filters to prevent relatively high energy neutral particles from contaminating the target substrate 41.

With continued reference to the exemplary implanter system depicted in FIG. 1, an end station 40 may also be provided to receive the mass analyzed, substantially decontaminated ion beam 18 from the beamline assembly. The end station 40 may support one or more workpieces such as semiconductor wafers or other target substrates 41 disposed along the path of the ion beam 18 to be implanted by the ion beam 18. The end station 40 may also comprise a wafer drive system (not shown) for moving wafers into and out of the path of the ion beam 18 and on to subsequent processing stages. The end station 40 may include one or more detectors (not shown) for detecting a dose level of ions exposed to a target workpiece.

The implanter system may also comprise a controller (not shown) and a vacuum system (not shown). As is known in the art, ion implantation is typically performed in the presence of a vacuum. The controller may be or include a general purpose computer or a network of general purpose computers that are programmed to perform desired input/output and other functions. In various embodiments, the controller may be a data processor programmed with instruction code for performing a semiconductor manufacturing process. In various embodiments, the controller may include a power and/or data connection to the various system components including the ion beam source station 5 and the end station 40. The controller may also include other electronic circuitry or components, such as application specific integrated circuits (e.g., ASICs), other hardwired or programmable electronic devices, discrete element circuits, FPGAs, etc. The controller may include devices, such as user input/output devices (keyboards, touch screens, user pointing devices, displays, printers, etc.), communication devices, data storage devices, mechanical drive systems, etc., to perform desired functions.

The controller may communicate with the wafer drive system at the end station 40, which is capable of moving a wafer relative to the ion beam 18. For example, the wafer drive system may scan a wafer across the ion beam 18 so as to implant ions on to the surface of the wafer. The wafer drive system may include various different devices or systems to physically move a wafer in a desired way. For example, the wafer drive system may include servo drive motors, solenoids, screw drive mechanisms, one or more air bearings, position encoding devices, mechanical linkages, robotic arms, or any other components that are well known in the art to move a wafer.

The vacuum system may communicate with the controller, e.g., to provide information to the controller regarding a current vacuum level in one or more portions of the chamber during an implantation process. The vacuum system may also include one or more pressure sensors that monitor pressure in the chamber and that communicate pressure readings to the controller. Alternatively, these pressure sensors may be separate from the vacuum system and in communication directly with the controller.

During implantation, the scanned ion beam 18 may impinge upon the surface of the target substrate (wafer) 41 which is supported on a platen 42 within a process chamber of the end station 40. It should be understood that the entire path traversed by the ion beam 18 may be under vacuum during implantation. The implantation process may be continued until all regions having the desired dopant concentration and implant depth are formed within the target substrate 41.

It should be understood that systems according to embodiments of the present disclosure may be used in connection with any ion implantation system or method, and that a different ion implantation system than the one illustrated in FIG. 1 may be utilized. Accordingly, the system illustrated in FIG. 1 may be modified as desired for a particular process. In some cases, systems of the present disclosure may include additional components than those illustrated. For example, a system may include an automated substrate handling system (not shown) for introducing substrates into the process chamber prior to implantation and for removing substrates from the process chamber after implantation and/or transporting them to other substrate processing equipment. In some cases, systems of the invention may not include all of the illustrated components.

Figure 2:
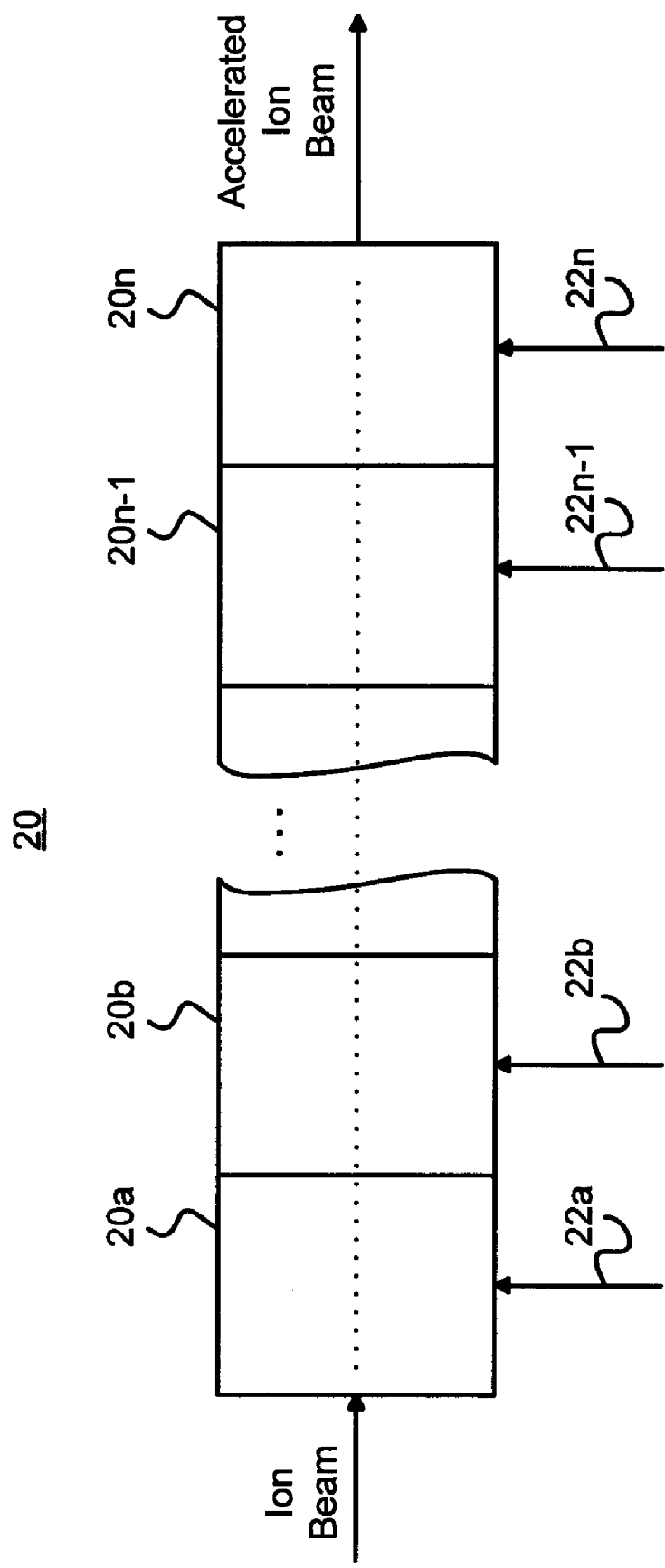
FIG. 2 is a schematic diagram of an ion beam accelerator according to at least one embodiment of the present disclosure.

Referring now to FIG. 2, there is shown a schematic diagram of an ion beam acceleration system 20 according to various embodiments of the present disclosure. The acceleration system 20 may comprise a series of individual acceleration electrodes for accelerating the ion beam 18 to a desired energy. The acceleration system 20 may be one several types of acceleration systems typically used in modern day ion implanters. A first such type of acceleration system is based on electrostatic field-driven particle acceleration. In such an accelerator, a required voltage (V) of a power supply is used to create an electrostatic field obtained by using an ionic valence value (n) of desired ions and a desired energy (E) of the ions, typically measured in kilo-electron volts (keV). When the electrostatic field is applied in multiple stages, the sum of all of the fields can be made to be equal to the value V.

A second type of ion beam acceleration system is based on radio frequency-based (RF) acceleration. This type of RF linear accelerator (linac) may comprise a plurality of individual resonator modules each having an accelerating electrode that is set at a particular amplitude (in kilovolts (kV)) and the frequency (in Hertz (Hz)).

In the exemplary acceleration system 20 depicted in FIG. 2, a plurality of acceleration segments 20a, 20b, ..., 20n-1 and 20n each apply a force to the ion beam 18 as it passes through system 20. The net affect of the segments 20a, 20b, ..., 20n-1 and 20n is to impart a total energy on the ion beam 18 equivalent to a desired ion energy for the particular type of implantation being performed. Each segment 20a, 20b, ..., 20n-1 and 20n is fed by a corresponding signal 22a, 22b, ..., 22n-1 and 22n that indicates an amount of energy to be imparted by that segment. These individual signals 22a, 22b, ..., 22n-1 and 22n may come from a voltage dividing circuit in the accelerator that is coupled to a terminal in electrical communication with an output of a power transformer, such as the high voltage power generation unit depicted in FIG. 3. In the case of an RF acceleration system, this may include both an amplitude and frequency. Each segment 20a, 20b, ..., 20n-1 and 20n may include an electrode and/or ring that specifically imparts energy upon the ion beam 18 as it passes by.

Figure 3:
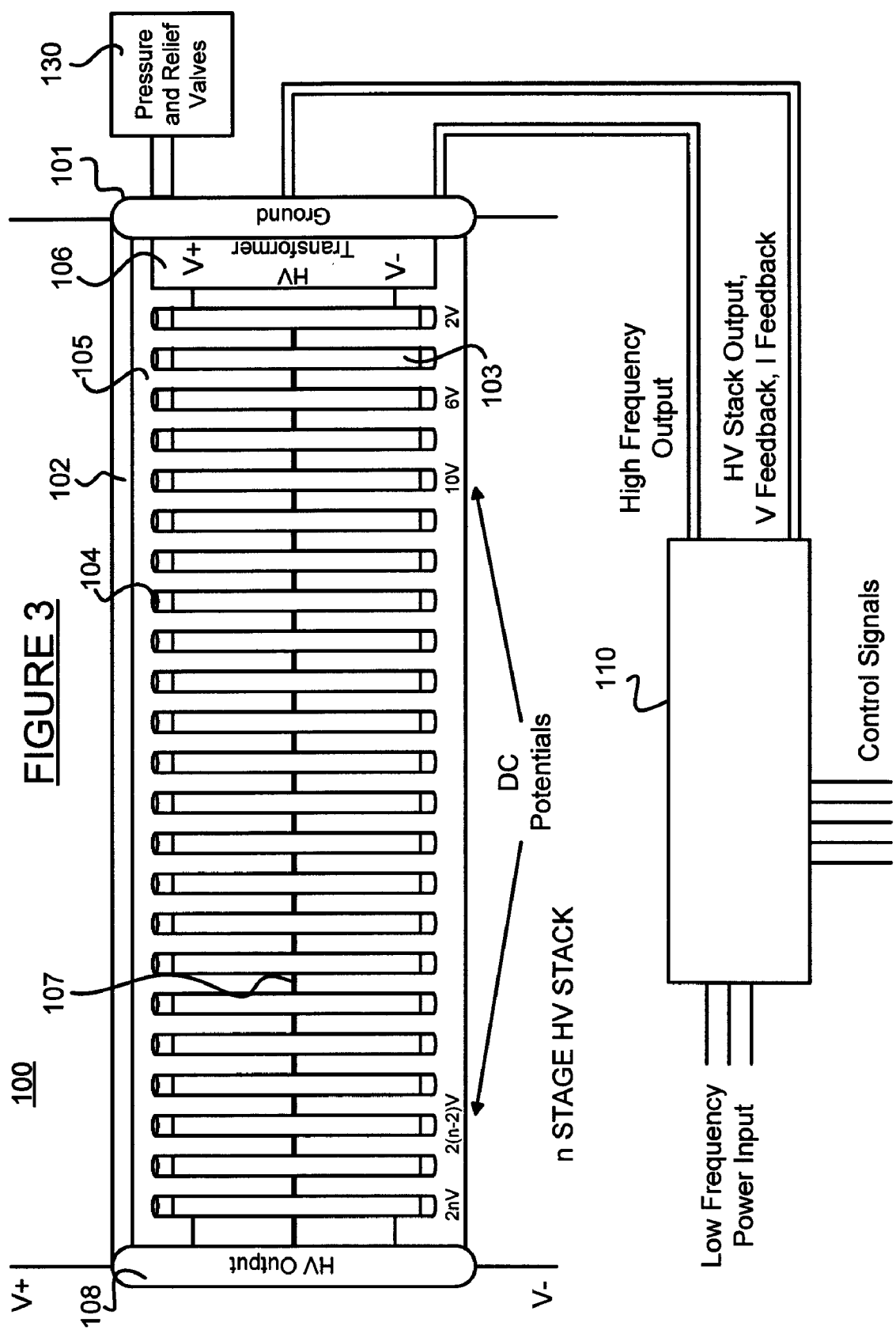
FIG. 3 is schematic diagram of a power supply system for an ion implantation device according to at least one embodiment of the present disclosure.

Referring now to FIG. 3, there is shown a schematic diagram of a power supply system for an ion implantation device according to at least one embodiment of the present disclosure. The power supply system includes a high voltage power generation unit 100. The high voltage power generation unit 100 includes a ground terminal 101, a transformer 106, a plurality of individual voltage multipliers 103, a plurality of voltage grading devices 104 corresponding to each multiplier 103 and a high voltage output terminal 108. The high voltage power generation unit 100 also includes a dielectric enclosure 102, an insulating medium 105, and a pressure source with valve mechanism 130.

The dielectric enclosure 102 may comprise a dielectric material in such as chlorinated polyvinylchloride (CPVC), Polytetrafluoroethylene (PTFE or otherwise known as Teflon), polyvinylidene fluoride (PVDF), ethylene chlorotrifluoroethylene (ECTFE), or other suitable dielectric material. In a preferred embodiment, the enclosure 102 may comprise a material that conforms to the requirements of FM4910. However, the material may be a material that conforms to the less rigid UL49V-0 standard. Also, the insulating medium 105 may preferably comprise a dielectric media having a dielectric strength above 32 kv/inch. Although dry air is known to breakdown at 75 kv/inch absolutely, it is common to design with a constraint of half or less than that to take into account humidity and other particle contamination that can cause electrical breakdown to occur at lower levels. In various embodiments, the internal stack components may be shrouded in a gas having a stronger breakdown property to increase their dielectric strength. For example, a liquid, a gas, or a vapor-gas mixture may be used to enhance the dielectric properties of the insulating medium 105. This material may enter the enclosure 102 from a system 130 containing a reservoir of the liquid, gas and/or vapor-gas mixture.

The power supply system of FIG. 3 may also include a high voltage stack driver 110 that controls and provides supply voltage to the high voltage power generation unit 100. The high voltage stack driver 110 may receive control signals from a controller of the implantation device in accordance with a control program for a particular implantation recipe. The voltage stack driver 110 may receive a low frequency power input and supply a high frequency stack power output to an input of the high voltage power generation unit 100.

Through the power supply system of FIG. 3, by enclosing the high voltage power generation unit 100 in a dielectric material, a relatively high operating voltage may be obtained in a relatively small form factor, internal components may be protected by the sealed enclosure, and the dielectric surface may be safe for an operator to touch without fear of discharge.

FIG. 4 is a block diagram of illustrating various components of a power supply stack driver for an ion implanter according to at least one embodiment of the present disclosure. The stack driver system 200, illustrating in block diagram form internal components of a stack driver such as stack driver 110 in FIG. 3, may comprise a plurality of individual modules providing various functionality that enables a power supply stack driver to control a multiplication stack to output a desired level high voltage level to an acceleration system. In the example of FIG. 4 there is a control bus module 205, a voltage input module 210, a voltage output module 210, and a feedback module 220. It should be appreciated that each module may be configured as a software application executing on computer hardware, an application specific integrated circuit (ASIC), a combination of hardware and software, physical connectors or other suitable configurations. Moreover, one or modules may be combined or broken into multiple additional modules.

In various embodiments, the control bus interface module 205 may comprise a processor or other control logic that receives control signals from a control unit of the implantation device. This may include signals indicative of a particular output voltage level required by the high voltage power generation unit. The voltage input module 210 may comprise a physical interface to a low frequency power input that supplies power to the stack driver and ultimately serves as the source power for the multiplication stack.

The voltage output module 215 may comprise a physical output interface as well as one or more power conversion units that, under the control of the control bus module 205, may convert the power signal received by the voltage input module 210 into a suitable high frequency high voltage multiplication stack input voltage. The feedback module 220 may receive a feedback signal of the output voltage of the high voltage power generation unit to ensure that the stack is imparting the appropriate energy to the ion beam 18. If the feedback module 220 detects any deviation from desired operation parameters, the feedback module 220 may cause the voltage output module 215 to adjust the output signal to the stack.

Each module listed in the exemplary stack driver 200 of FIG. 4 may operate autonomously or under the control of the control bus module 205. For example, in various embodiments, the control bus module 205 may include a central processing unit (CPU), digital signal processor (DSP) or other embedded processor. Alternatively, the control bus module 205 may include a real time kernel of a control program executed by a data processor associated with a control unit of the ion implantation device. The control bus module 205 may also include one or more analog control circuits. Furthermore, it should be appreciated that the particular modules illustrated in FIG. 4 are exemplary only and should not be construed as either necessary or exhaustive. In various embodiments, it may be desirable to use more, less, or even different modules than those illustrated in FIG. 4.

FIG. 5 is a graph illustrating surface flashover test results for a plurality of different dielectric materials. In FIG. 5, dielectric strength as a function of electrode spacing is shown for three dielectric materials: sintra, a moderately expanded closed-cell polyvinyl chloride (PVC), polytetrafluoroethylene (PTFE), and chlorinated PVC, represented by diamonds, triangles, and squares, respectively. The choice of internal insulating medium material of the stack should be made to avoid corona discharge and flashover arcs inside the dielectric barrier to prevent damage to internal stack components. Also, the outside should be sufficiently insulated to prevent ground discharge to a person touching the enclosure.

Through the various embodiments of the disclosure, a relatively small, high voltage power transformer may be provided with improved operating performance, reduced risk of internal flashover arcs, and reduced size over existing acceleration voltage power supplies for ion implantation equipment.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A power supply for an ion implantation system comprising:
   a power inverter;
   a high voltage power generation unit that receives source power from the power inverter, wherein the high voltage generation unit comprises a high voltage transformer for providing an output power that is multiplied to a desired output level;
   an enclosure comprising a dielectric material to encase at least a portion of the high voltage power generation unit;
   an interface control bus coupled to the high voltage power generation unit to receive control signals indicative of the desired output level of the high voltage power generation unit; and
   circuitry communicatively coupled to the interface control bus and responsive to the control signals to adjust the high voltage output based on the control signals, wherein the circuitry comprises a stack driver.

2. The power supply according to claim 1, further comprising a gas supply in communication with the enclosure.

3. The power supply according to claim 2, further comprising a electronically controlled valve mechanism that controls a flow of gas from the gas supply into the enclosure.

4. The power supply according to claim 1, wherein the dielectric material comprises a material in compliance with either FM4910 or UL94V-0.

5. The power supply according to claim 1, wherein the enclosure comprises an insulating medium having a dielectric strength value greater than 32 kV per inch.

6. The power supply according to claim 1, wherein the stack driver comprises a control circuit having a power input and a power output that is supplied to a power input of the high voltage power generation unit.

7. The power supply according to claim 1, wherein an output of the high voltage power generation unit is coupled to a power input terminal of an ion beam accelerator.

8. An ion implantation device comprising:
   an ion source to generate an ion beam;
   at least one ion beam accelerator to accelerate the ion beam to a desired energy level;
   a power supply operatively connected to the ion beam accelerator;
   at least one mass analyzer to remove undesired ion species from the ion beam;

at least one beam shaping element to shape and direct the ion beam;

a substrate processing end station upon which the shaped ion beam is incident; and a controller communicatively coupled to the ion source, the power supply, and the end station, wherein the power supply comprises:

a power inverter;

a high voltage power generation unit that receives source power from the power inverter;

an enclosure comprising a dielectric material to encase at least a portion of the high voltage power generation unit; and a stack driver.

9. The ion implantation device according to claim 8, wherein the high voltage power generation unit comprises a transformer for providing an output power that is multiplied to a desired output level and supplied to the accelerator.

10. The ion implantation device according to claim 8, wherein the power supply further comprises a gas supply to communicate a gas to the enclosure.

11. The ion implantation device according to claim 8, wherein the power supply further comprises an electronically controlled valve mechanism to control a flow of a gas into the enclosure.

12. The ion implantation device according to claim 8, wherein the enclosure comprises an insulating material in compliance with either FM4910 or UL94V-0.

13. The ion implantation device according to claim 8, wherein the enclosure comprises an electrically insulating medium having dielectric strength value greater than 32 k volts per inch.

14. The ion implantation device according to claim 8, wherein the stack driver comprises an interface control bus coupled to the high voltage power generation unit to receive control signals indicative of a desired voltage output level and to cause the high voltage power generation unit to output a level of power to the accelerator based on the control signals.

15. A power supply system for ion implantation equipment comprising:

a power inverter;

a high voltage power generation unit that receives source power from the power inverter, wherein the high voltage power generation unit comprises a transformer for providing an output power that is multiplied to a desired output level and supplied to an ion beam accelerator;

an enclosure comprised of a dielectric material to encase at least a portion of the high voltage power generation unit; and a stack driver to receive controls signals from a computerized controller of the implantation equipment, indicative of a desired output power of the transformer and to cause the high voltage power generation unit to output the output power at the desired output level.

16. The power supply system according to claim 15, further comprising a gas supply that communicates a gas to the enclosure, and an electronic valve mechanism communicatively coupled to the stack driver to control a pressure of gas in the enclosure, wherein the gas has an electrical breakdown strength of 32 kv per inch or greater.

* * * * *